May 8, 1934.  C. J. HELM  1,957,594
DISTRIBUTOR
Original Filed Jan. 7, 1930    2 Sheets-Sheet 1

INVENTOR
C.J.Helm
BY
Siggers & Adams
ATTORNEYS

May 8, 1934.                    C. J. HELM                    1,957,594
                                DISTRIBUTOR
                    Original Filed Jan. 7, 1930      2 Sheets-Sheet 2
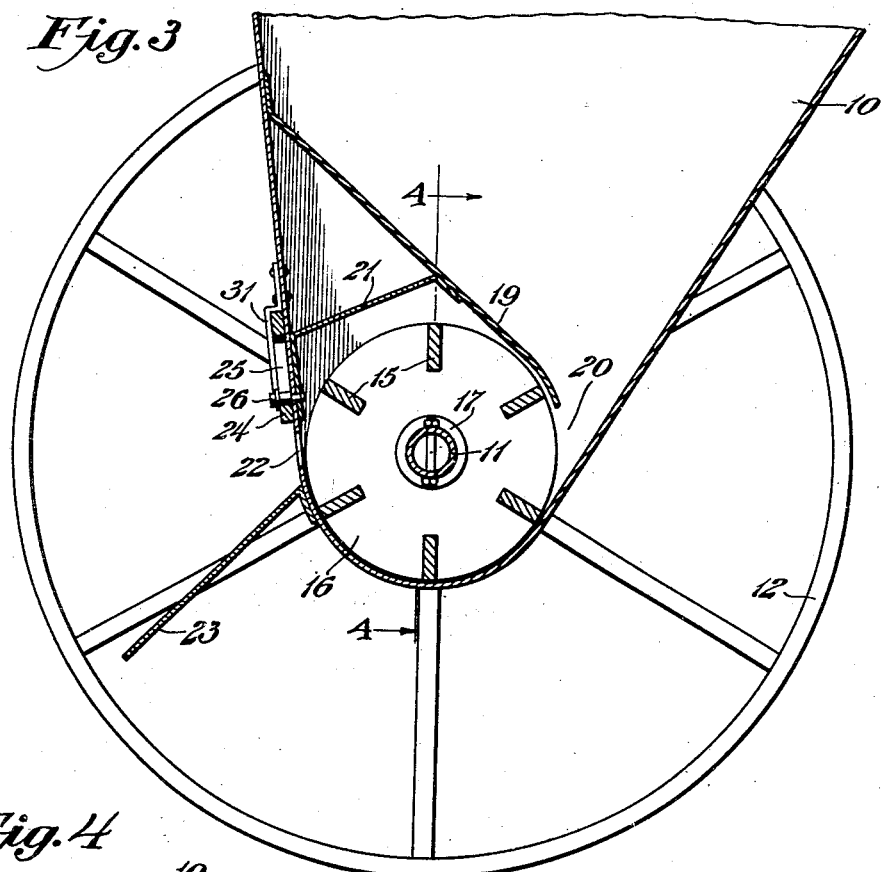
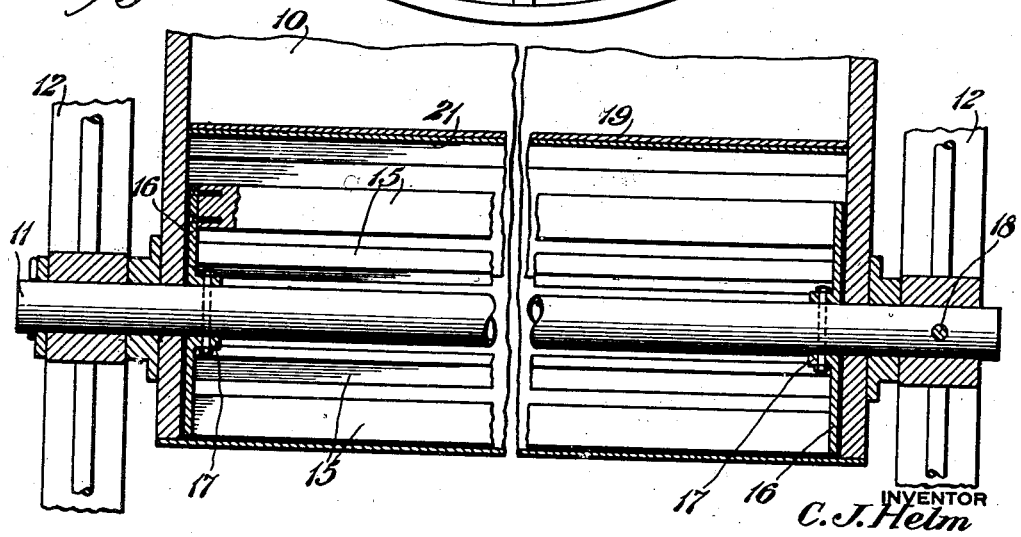
INVENTOR
C. J. Helm
BY
Siggers & Adams
ATTORNEYS Patented May 8, 1934

1,957,594

UNITED STATES PATENT OFFICE 1,957,594

DISTRIBUTOR

Charles J. Helm, Ypsilanti, Mich., assignor to O. E. Thompson & Sons, Ypsilanti, Mich., a corporation of Michigan Application January 7, 1930, Serial No. 419,088
Renewed September 15, 1933

2 Claims. (Cl. 275—2)

This invention relates to distributors or spreaders and, among other objects, aims to provide an improved machine either for distributing fertilizer and other plant foods or for sowing seeds. Among the important features of the machine is a novel positive feeding mechanism constructed and arranged to discharge either dry or damp material at a uniform rate irrespective of the weight or quantity of material in the hopper.

Other aims and advantages of the invention will appear in the specification, when considered in connection with the accompanying drawings, wherein:

Fig. 3 is a fragmentary sectional view taken on the line 3—3 of Fig. 2; and

Fig. 4 is a fragmentary sectional view taken on the line 4—4 of Fig. 3.

Figure 1:
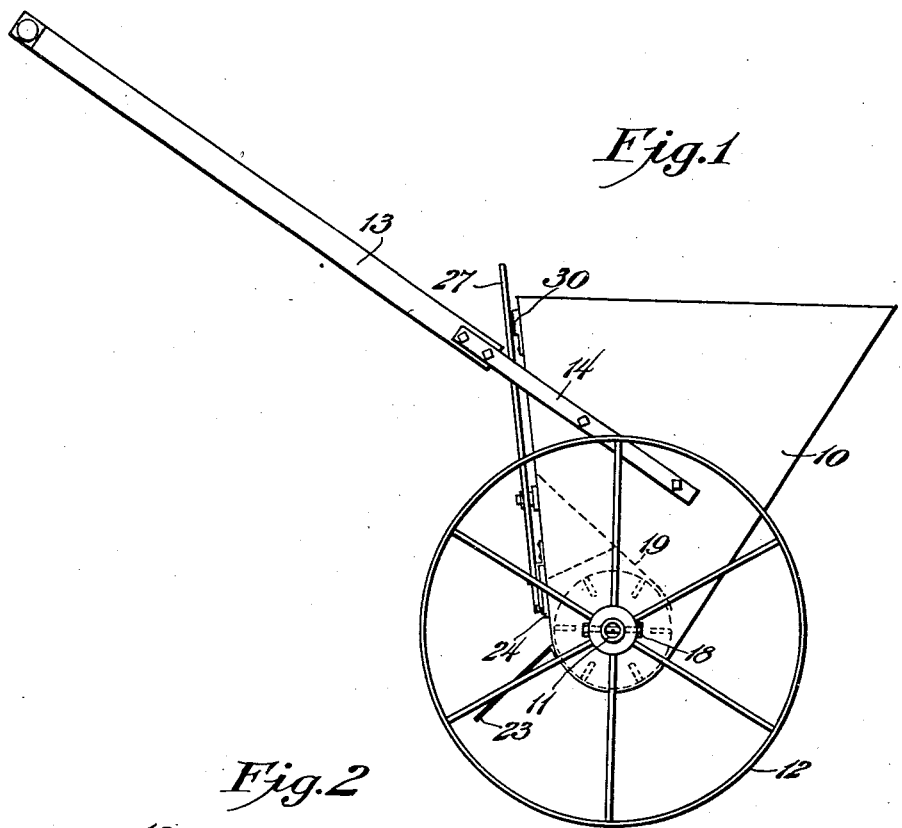
Fig. 1 is a side elevation of a manually operable machine embodying the invention.

Referring more particularly to the drawings, the distributor there shown is of the hand operated type and includes a hopper 10 mounted on an axle 11 and supported by a pair of ground wheels 12 at the opposite sides. A suitable handle 13 is shown as being connected to the opposite sides of the hopper, being conveniently made of wood and secured thereto by means of metal strap members 14 bolted to the side walls.

Referring to Figs. 1 and 3, the front and rear walls of the hopper 10 are shown as converging downwardly and have an arcuate or curved bottom with its center of curvature or axis the same as that of the axle 11. Attached to the axle, which, in this example, is made of an ordinary piece of pipe journaled in wooden side walls of the hopper, is a rotary feeder composed of a plurality of radial webs in the form of flat metal bars or strips 15 secured at their opposite ends to metal disks 16 adjacent to the side walls of the hopper. These disks are here shown as presenting cylindrical flanges 17 bolted to the axle.

Only one of the ground wheels is shown as being connected to rotate the axle by means of a bolt 18, the other wheel being free to rotate with respect thereto (see Fig. 4). The arrangement of the feeder blades or webs is such that, as they rotate in a clockwise direction as viewed in Figs. 1 and 3, they will feed the material backwardly in the hopper. They cannot become clogged up or choked because they are spaced from the axle and do not provide pockets within which damp material may be packed.

In this example, there is shown a sheet metal baffle member 19 extending forwardly and downwardly from the rear wall of the hopper and terminating short of the front wall so as to provide a gravity feed opening 20 to the feeder. This baffle is conveniently braced by means of a sheet metal brace member 21 also connected to the rear wall of the hopper and to the lower side of the baffle, (see Fig. 3). The arrangement is such that the fertilizer or other material in the hopper is conveyed by the feeder to a series of discharge openings 22 conveniently arranged in one or more horizontal rows in the rear wall of the hopper above the bottom so that the operator may at all times observe the discharging material. These openings may be of any suitable shape, but are here shown as being circular and arranged close together so that the material is fed more uniformly entirely across the hopper. A scatter-board 23 is shown as being secured to the rear wall of the hopper and projects rearwardly and downwardly therefrom below the outlet openings. The material discharged from the outlet openings falls on the scatter-board and is distributed uniformly before it drops off the lower edge.

Figure 2:
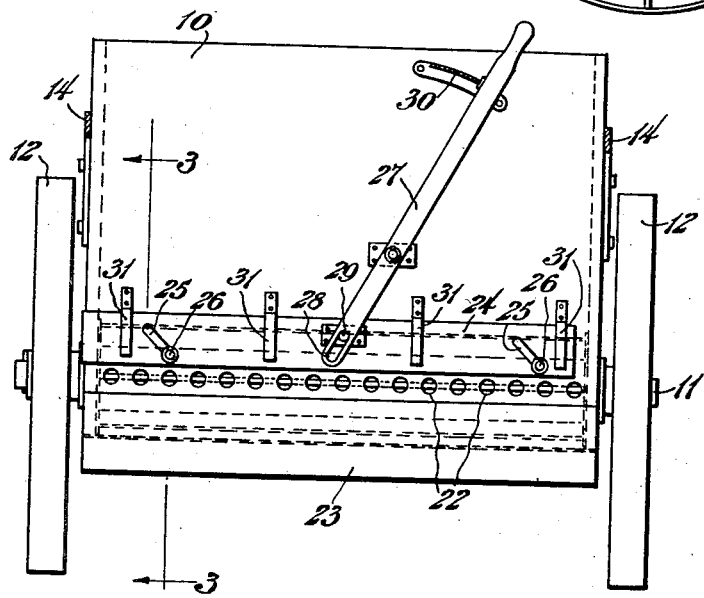
Fig. 2 is a rear elevation.

To regulate or control the flow of the discharge of the material, there is shown a regulating or cut-off gate 24 slidably arranged above the openings 22 and having oblique, parallel slots 25 receiving fixed studs or bolts 26 projecting from the rear wall. A hand lever 27 is shown as being pivoted intermediate its ends to the rearwall of the hopper and connected at its lower end to the regulating and cut-off gate by means of an elongated slot 28 and a pin 29 fixed on the gate. As will be seen in Figs. 1 and 2, the lever 27 has a locking segment 30 near the top of the rear wall so as to hold it in adjusted positions. In this example, a series of brackets 31 are secured to the rear wall of the hopper to guide the gate as it is moved up or down to regulate the feed openings. When the lever 27 is moved to the left as viewed in Fig. 2, the cut-off gate is lowered partially to close the circular feed openings. In the position shown, the gate is at the upper limit of its movement In the operation of the device, the material in the hopper is positively fed by the webs so that it is discharged through the openings. If any of the material is carried past the openings by the webs, it is free to fall back to the bottom of the hopper past the axle, thus making it impossible for the excess material to clog up a pocket as would be the case if the feeder were composed of webs extending from the axle. Experience has demonstrated that this construction and design is eminently adapted not only for scattering dry seeds and fertilizers, but for handling more or less damp materials including top dressings and other plant foods.

From the foregoing, it will be seen that the simple hand machine shown can be manufactured at a very low cost. There are no complicated parts that require replacement or repairs. Moreover, the arrangement of the outlet openings is such that an operator can always observe the flow of materials from time to time and can tell whether any opening has become clogged or choked up. Furthermore, the feed is uniform irrespective of the weight of material in the hopper. Less power is required to operate the device because the reel does not rotate through a mass of heavy material in the bottom of the hopper, since the bottom is never entirely filled. Thus, the parts can be made of less weight and strength than other distributors wherein the feeders or agitators are rotated through the mass of material and discharge it through bottom outlet openings.

Obviously, the present invention is not restricted to the particular embodiment thereof herein shown and described.

What is claimed is:

1. A distributor of the class described comprising, in combination, a hopper having a curved bottom wall; a rotary feeder in the bottom of the hopper and having a series of relatively narrow radial blades spaced from the axis of the feeder whose outer edges scrape against said curved bottom wall when the feeder rotates; a ground wheel connected to rotate said feeder; a baffle in the hopper providing a gravity feed opening for the feeder adjacent to the front wall of the hopper; the rear wall of the hopper having a discharge opening above the bottom of the hopper; and a scatterboard secured to said hopper below said discharge opening.

2. A distributor comprising, in combination, a hopper having a curved bottom; a rotary feeder having scraping contact with said curved bottom; a forwardly and downwardly inclined baffle in the hopper leaving a gravity feed opening in front of the feeder; a discharge opening in the hopper behind the feeder and about on the level of the axis of the feeder; a regulating gate for the opening; operator-controlled means to adjust said gate; a pair of ground wheels one of which is operatively connected to the feeder; and a handle connected to the hopper.

CHARLES J. HELM.